US012707331B2

(12) United States Patent
Krishan et al.

(10) Patent No.: US 12,707,331 B2
(45) Date of Patent: Aug. 11, 2026

(54) NETWORK SESSION PROCESSING BASED ON SLICE LOAD

(71) Applicant: Oracle International Corporation, Redwood City, CA (US)

(72) Inventors: Rajiv Krishan, Cary, NC (US); Geeta Mohanty, Bengaluru (IN); Tukaram Maruti Khandekar, North Chelmsford, MA (US)

(73) Assignee: Oracle International Corporation, Redwood City, CA (US)

( * ) Notice: Subject to any disclaimer, the term of this patent is extended or adjusted under 35 U.S.C. 154(b) by 295 days.

(21) Appl. No.: 18/536,900

(22) Filed: Dec. 12, 2023

(65) Prior Publication Data

US 2025/0193737 A1 Jun. 12, 2025

(51) Int. Cl.

| | |
|---|---|
| ***H04W 28/08*** | (2023.01) |
| ***H04W 28/16*** | (2009.01) |
| ***H04W 36/22*** | (2009.01) |
| ***H04W 48/18*** | (2009.01) |
| ***H04W 72/12*** | (2023.01) |

(52) U.S. Cl.

CPC ....... *H04W 28/0942* (2020.05); *H04W 48/18* (2013.01)

(58) Field of Classification Search

CPC .. H04W 28/0942; H04W 48/18; H04L 43/16; H04L 41/0897; H04L 41/0895; H04L 41/0894

USPC .......................................................... 455/453

See application file for complete search history.

(56) References Cited

U.S. PATENT DOCUMENTS

| | | | | |
|---|---|---|---|---|
| 2021/0083956 | A1* | 3/2021 | Fan | H04L 43/0876 |
| 2021/0250785 | A1* | 8/2021 | Örtenblad | H04W 24/02 |
| 2022/0394596 | A1* | 12/2022 | Casati | H04W 48/06 |
| 2024/0397417 | A1* | 11/2024 | Liu | H04W 28/24 |
| 2025/0126504 | A1 | 4/2025 | Paczkowski et al. | |

OTHER PUBLICATIONS

IP.com search history (Year: 2025).*

"5G; Policy and charging control framework for the 5G System (5GS); Stage 2 (3GPP TS 23.503 version 17.7.0 Release 17)", ETSI Technical Specification, Jan. 6, 2023, 16 pages.

Extended European Search Report for EP Application No. 24218788.8, mailed Apr. 9, 2025, 11 pages.

Shabnam Sultana et al. "Correction to network slice replacement," 3GPP Draft; S2-2312510; Type CR; CR 1213; ENS_PH3, 3rd Generation Partnership Project (3GPP) Nov. 3, 2023, 20 pages.

* cited by examiner

*Primary Examiner* — Moustapha Diaby

(57) ABSTRACT

Various embodiments of the present technology generally relate to systems and methods for performing network session processing based on slice load. In certain embodiments, a policy control function (PCF) system may comprise one or more processors, and a memory having stored thereon instructions. The instructions, upon execution, may cause the one or more processors to receive a network session request corresponding to a specified network slice, a network slice including a particular portion of a network's capacity, determine a load level of the specified network slice, and reject the network session request when the load level is above a selected threshold.

20 Claims, 8 Drawing Sheets

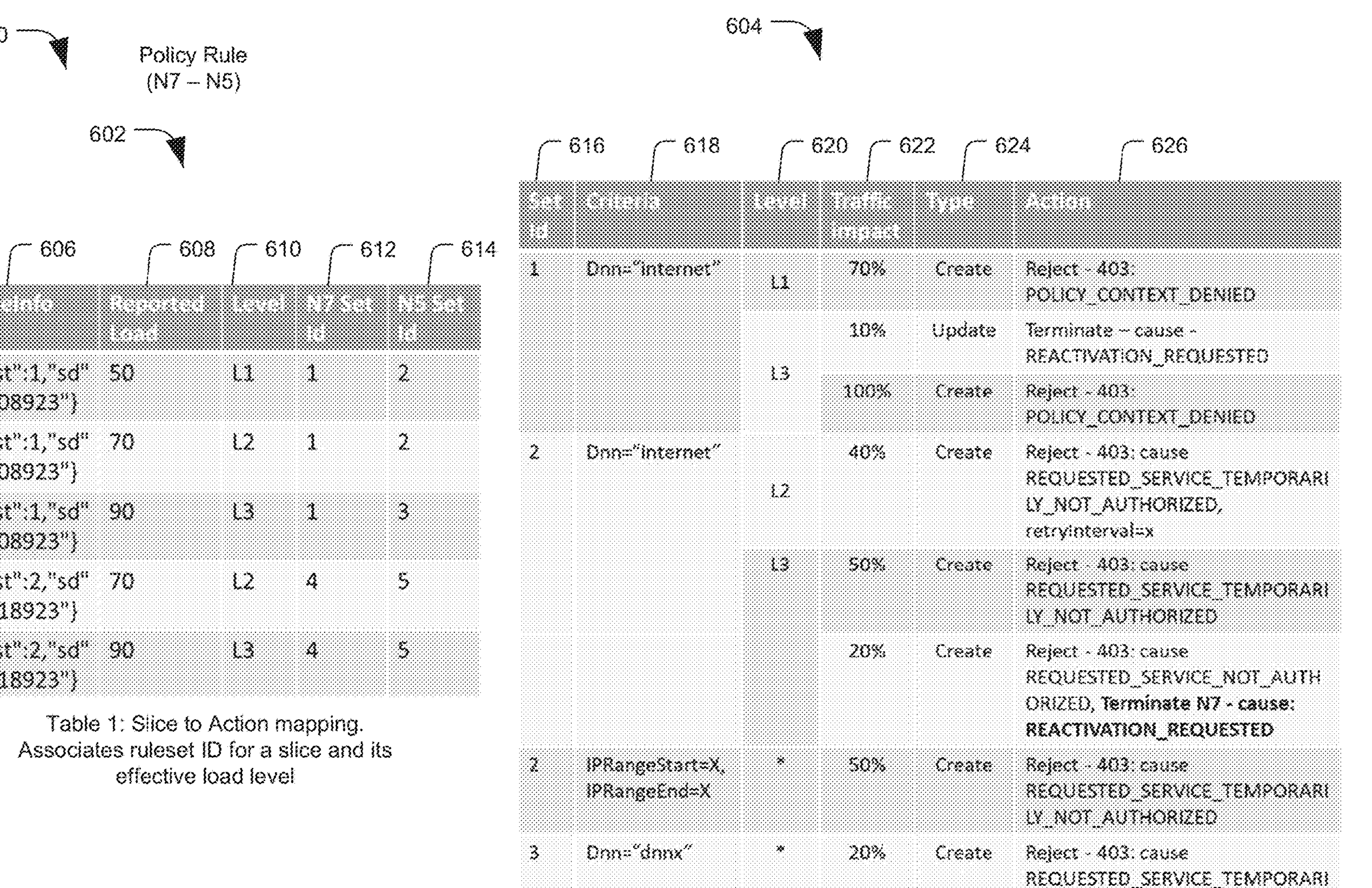

| SliceInfo | Reported Load | Level | N7 Set Id | N5 Set Id |
|---|---|---|---|---|
| {"sst":1,"sd":"A08923"} | 50 | L1 | 1 | 2 |
| {"sst":1,"sd":"A08923"} | 70 | L2 | 1 | 2 |
| {"sst":1,"sd":"A08923"} | 90 | L3 | 1 | 3 |
| {"sst":2,"sd":"B18923"} | 70 | L2 | 4 | 5 |
| {"sst":2,"sd":"B18923"} | 90 | L3 | 4 | 5 |

Table 1: Slice to Action mapping. Associates ruleset ID for a slice and its effective load level

| Set Id | Criteria | Level | Traffic impact | Type | Action |
|---|---|---|---|---|---|
| 1 | Dnn="internet" | L1 | 70% | Create | Reject - 403: POLICY_CONTEXT_DENIED |
| | | L3 | 10% | Update | Terminate – cause - REACTIVATION_REQUESTED |
| | | | 100% | Create | Reject - 403: POLICY_CONTEXT_DENIED |
| 2 | Dnn="internet" | L2 | 40% | Create | Reject - 403: cause REQUESTED_SERVICE_TEMPORARILY_NOT_AUTHORIZED, retryinterval=x |
| | | L3 | 50% | Create | Reject - 403: cause REQUESTED_SERVICE_TEMPORARILY_NOT_AUTHORIZED |
| | | | 20% | Create | Reject - 403: cause REQUESTED_SERVICE_NOT_AUTHORIZED, **Terminate N7 - cause: REACTIVATION_REQUESTED** |
| 2 | IPRangeStart=X, IPRangeEnd=X | * | 50% | Create | Reject - 403: cause REQUESTED_SERVICE_TEMPORARILY_NOT_AUTHORIZED |
| 3 | Dnn="dnnx" | * | 20% | Create | Reject - 403: cause REQUESTED_SERVICE_TEMPORARILY_NOT_AUTHORIZED |
| ... | ... | ... | ... | ... | ... |

Table 2: Definitions for a given action

FIG. 6

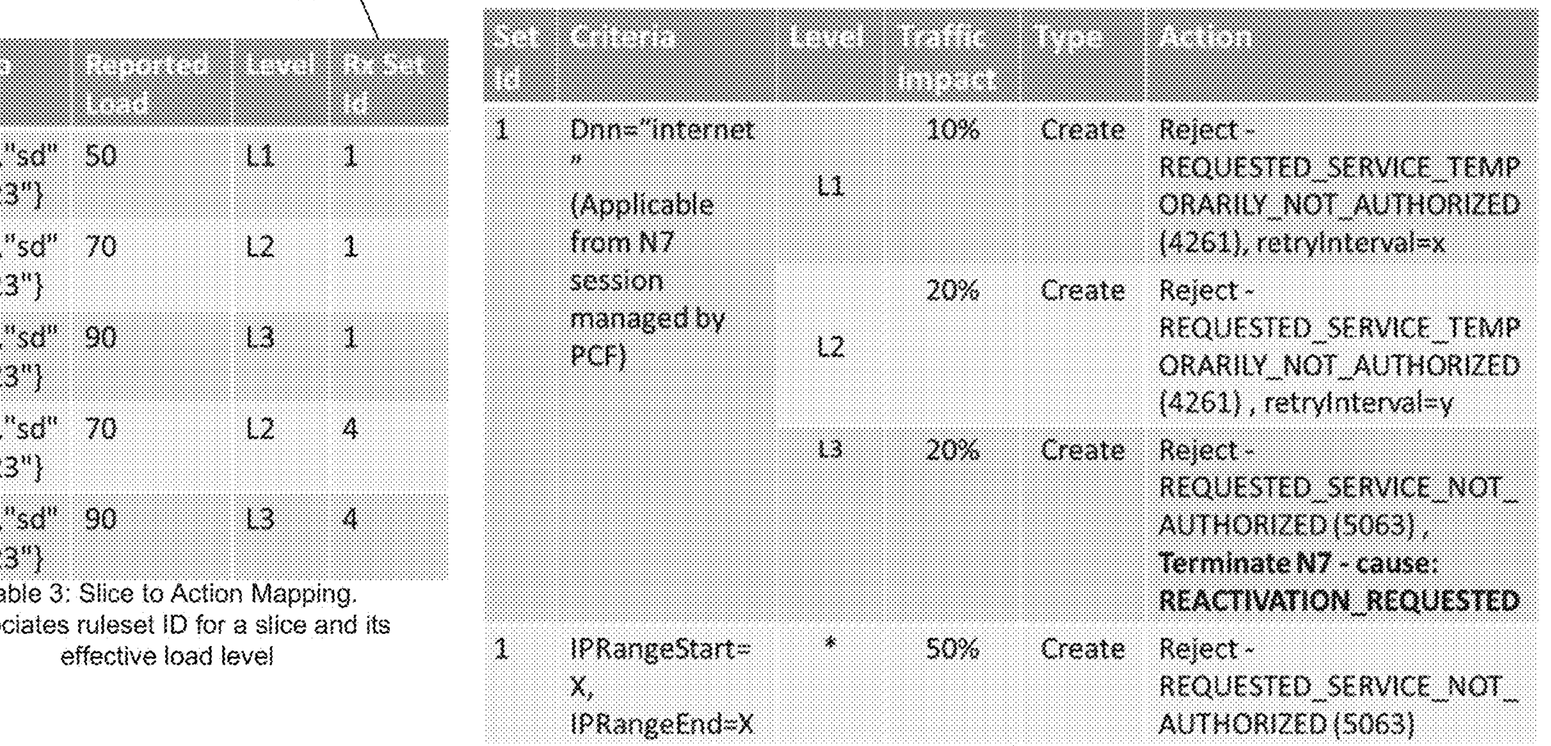

| SliceInfo | Reported Load | Level | Rx Set Id |
|---|---|---|---|
| {"sst":1,"sd":"A08923"} | 50 | L1 | 1 |
| {"sst":1,"sd":"A08923"} | 70 | L2 | 1 |
| {"sst":1,"sd":"A08923"} | 90 | L3 | 1 |
| {"sst":2,"sd":"B18923"} | 70 | L2 | 4 |
| {"sst":2,"sd":"B18923"} | 90 | L3 | 4 |

Table 3: Slice to Action Mapping. Associates ruleset ID for a slice and its effective load level

| Set Id | Criteria | Level | Traffic impact | Type | Action |
|---|---|---|---|---|---|
| 1 | Dnn="internet" (Applicable from N7 session managed by PCF) | L1 | 10% | Create | Reject - REQUESTED_SERVICE_TEMPORARILY_NOT_AUTHORIZED (4261), retryInterval=x |
| | | L2 | 20% | Create | Reject - REQUESTED_SERVICE_TEMPORARILY_NOT_AUTHORIZED (4261) , retryInterval=y |
| | | L3 | 20% | Create | Reject - REQUESTED_SERVICE_NOT_AUTHORIZED (5063) , **Terminate N7 - cause: REACTIVATION_REQUESTED** |
| 1 | IPRangeStart=X, IPRangeEnd=X | * | 50% | Create | Reject - REQUESTED_SERVICE_NOT_AUTHORIZED (5063) |

Table 4: Definitions for a given action

FIG. 7

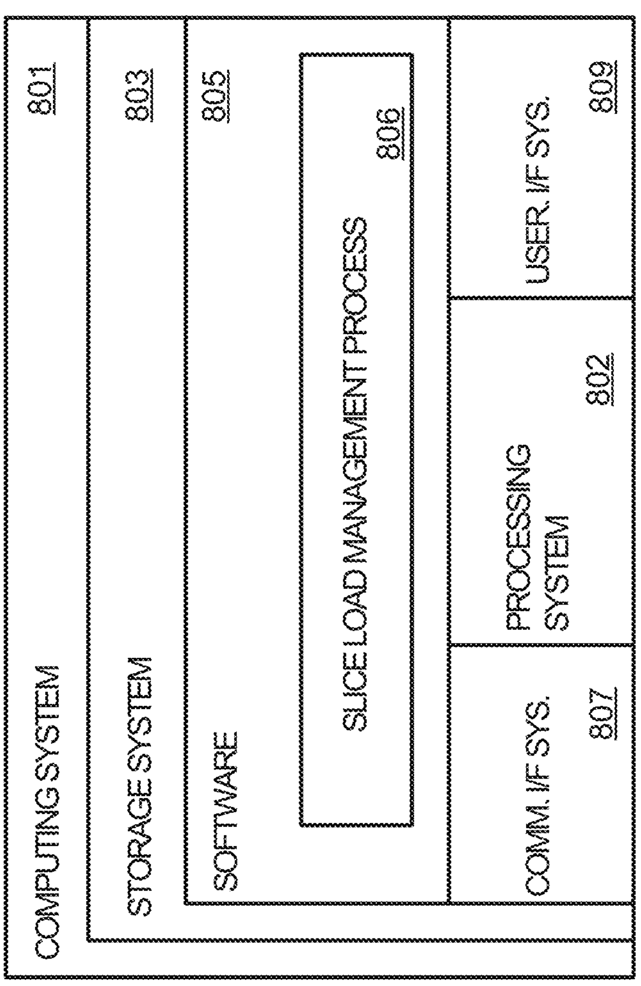
FIG. 8

NETWORK SESSION PROCESSING BASED ON SLICE LOAD

TECHNICAL FIELD

Various embodiments of the present technology generally relate to management of networks, such as fifth generation (5G) communications networks. More specifically, embodiments of the present technology relate to systems and methods for improved functionality of networks through slice load decongestion.

BACKGROUND

In some communication network architectures (e.g., those using third generation partnership project, 3GPP standards), service may be implemented by establishing a user communication session, such as a PDU (packet data unit or protocol data unit) session or session management (SM) session. For example, user equipment (UE) may register with the network and trigger the creation of a session in order to exchange data with the network. In a 5G network, the establishment of a PDU or SM session may be performed via an N7 protocol message, and may be called an N7 session. Once a session is established, data resources for the session may be managed via N5 or Rx protocol messages. As part of the initial session creation process, a UE or session may be assigned to a network slice to service the session.

Broadly speaking, a slice may be a particular portion of a network's capacity, with each slice configured or allocated based on the specific needs of, for example, an application, use case, or customer. For example, different slices of a network may be configured to handle or provide different throughput or bandwidth, latency, quality of service (QoS), or other attributes or rules for handling sessions. Different slices may be assigned for, e.g., enterprise-level customers of a network, vehicle-to-vehicle communications, or other types of user, equipment, or use case scenarios. So based on who the customer is and what service is being requested, a different slice may be assigned to the session. Slices may be implemented in various ways by network operators, including through logical divisions, physical divisions, or a combination. For example, different slices may have one or more physical components and interfaces dedicated to the slice, or slices may share physical components, but reserved bandwidth may be logically allotted differently to the various slices. The implementation may be largely left to network operators, but each slice may still have a finite capacity to handle traffic. If a slice is too congested, it may result in poor or dropped service for PDUs on that slice.

The 3GPP technical specification (TS) provide that an AMF (access and mobility management function) and NSSF (network slice selection function) may perform slice selection during PDU establishment (see, e.g., TS 23.501). However, AMF may not be configured to apply complex policy in allowing or rejecting PDU sessions based on various factors including customer or application priority and slice load levels. Further, 3GPP defines processes for handling N5 session requests on an overloaded slice, but provides no guidelines for handling Rx messages, e.g., in N7 to Rx interworking cases. Accordingly, there exists a need for improved management of slice congestion or load in networks.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for performing configuration data management. In an embodiment, a policy control function (PCF) system may comprise one or more processors, and a memory having stored thereon instructions. The instructions, upon execution, may cause the one or more processors to receive a network session request corresponding to a specified network slice, a network slice including a particular portion of a network's capacity, determine a load level of the specified network slice, and reject the network session request when the load level is above a selected threshold.

In some examples, the PCF system may subscribe to receive a slice load level notification from a network data analysis function (NWDAF), and determine the load level based on information in the slice load level notification. The PCF system may receive the slice load level notification from the NWDAF for the specified network slice identifying a current load level value, store the current load level value, and determine the load level based on retrieving the current load level value. The PCF system may subscribe to receive the slice load level notification by issuing a subscription message identifying a selected network slice to receive a notification on, and a selected load level threshold at which to receive the notification. In some embodiments, the PCF system may determine whether the specified network slice from the network session request corresponds to a subscribed network slice for which the PCF receives the slice load level notification, and when the specified network slice does not correspond to the subscribed network slice, send an on-demand request to the NWDAF for the load level of the specified network slice. In some examples, the PCF system may compare the load level of the specified network slice against a set of policy rules including the selected threshold and a second threshold, and reject a selected percentage of network session requests for the specified network slice when the load level is above the second threshold but below the selected threshold. According to some embodiments, the network session request may include a request to create a packet data unit (PDU) session on a 5G network, received from a session management function (SMF). In other embodiments, the network session request includes a session to manage resources associated with a packet data unit (PDU) session on a 5G network, the session to manage resources initiated via an Rx protocol message or an N5 protocol message from an application function (AF). The PCF system may, based on the load level being above the selected threshold, evaluate a policy rule table to determine whether to terminate the PDU session associated with the session to manage resources, and terminate the PDU session based on the policy rule table. In some examples, the PCF system may determine the load level, including sending an on-demand request to a network data analysis function (NWDAF) to receive a response including the load level of the specified network slice.

In an alternative embodiment, a method may comprise operating a policy control function (PCF) of a mobile network, including receiving a network session request corresponding to a specified network slice, a network slice including a particular portion of a network's capacity, determining a load level of the specified network slice, and rejecting the network session request when the load level is above a selected threshold.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein.

FIG. 6 is a set of tables of a system configured to implement network session processing based on slice load, in accordance with certain embodiments of the present disclosure;

FIG. 7 is a set of tables of a system configured to implement network session processing based on slice load, in accordance with certain embodiments of the present disclosure; and FIG. 8 is a diagram of a system configured to implement network session processing based on slice load, in accordance with certain embodiments of the present disclosure.

Figure 1:
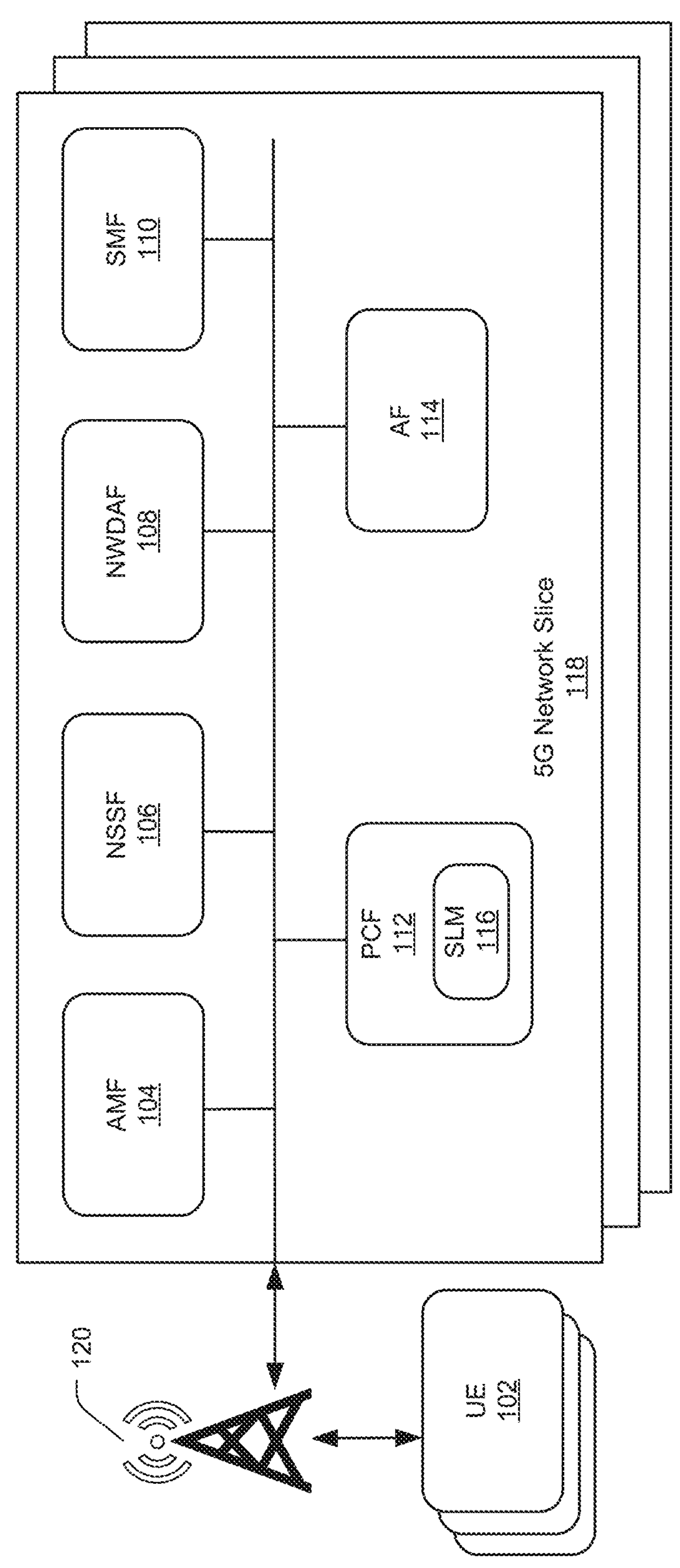
FIG. 1 is a diagram of a system configured to implement network session processing based on slice load, in accordance with certain embodiments of the present disclosure.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 is a diagram of a system 100 configured to implement network session processing based on slice load, in accordance with certain embodiments of the present disclosure. The example system 100 may include a mobile network implementing 3GPP (3rd Generation Partnership Project) communication standards (e.g., using the 29.214, 29.514, and 29.520 technical specifications (TS)), although the present disclosure may apply to other communication networks. In particular, the mobile network may include components and elements to implement a 5G cellular network having its capacity distributed across a plurality of network slices 118. The system 100 may include one or more user equipment (UE) 102 connected to 5G network slices 118 via network connectivity components 120.

Each or any of UE 102, 5G network slice 118 and its components, and network connectivity components 120 may be implemented via computers, servers, hardware and/or software modules, and/or other system components. The components of 5G network slices 118, or the physical devices implementing them, may be co-located, remotely distributed, or any combination thereof. The elements of system 100 may include components hosted or situated in the cloud and/or implemented as software modules potentially distributed across one or more server devices (including network connectivity components) or any other physical components.

UE 102 may be a device, system, or module that may utilize the resources of the 5G network slices 118, such as to establish communications with another UE or to access the internet. Communication sessions may include but are not limited to IMS calls (Internet Protocol Multimedia subsystem), other cell phone calls, internet or other data connections, or any and all other types of communications sessions over 5G networks. UE 102 may include devices such as cell phones, tablets, modems, vehicles, desktop or laptop computers, televisions or set-top boxes, smart home devices, voice over IP (VoIP) devices, internet of things (IoT) devices, or any and all other systems that may utilize a cellular network.

Network connectivity components 120 may provide communication paths between UE 102 and 5G network slices 118. Network connectivity components 120 may comprise components that enable communication over communication links, such as network cards, ports, radio frequency (RF) modules, telecommunications channels, cell towers, switches, routers, processing circuitry and software, or other communication components. Network connectivity components 120 may include metallic, wireless, cellular, or optical links, using various communication formats and protocols. In some examples, network connectivity components 120 may simply be referred to as a "network" by which systems or modules are connected or communicate.

The 5G network slices 118 may each include part of a mobile communications network that provides services to UEs 102 through the network connectivity components 120. 5G network slices 118 may include a plurality of components, modules, or network functions (NFs) configured to provide mobile communication services. Some components of 5G network slices 118 may be shared across two or more slices, while other components may be unique to each slice or only allocated to a single slice at a time. Different slices of 5G network slices 118 may be configured to manage different customers or accounts, application or use cases, quality of service requirements, throughput or bandwidth requirements, or have other attributes or rules about what sessions are to be assigned to a given slice. When a UE 102 seeks to register or initiate a session with a 5G network, it may specify network slice selection assistance information (NSSAI) and data network name (DNN) information, among other potential information. The NSSAI information may indicate a type of slice requested. The DNN may sometimes be in the form of an APN (Access Point Name), and may describe the external network to which the 5G components will connect, such as the internet, IMS (IP multimedia subsystem), or a corporate intranet. Based on the information provided by the UE 108, it may be assigned to a 5G network slice 118.

5G network slice 118 may include a variety of NFs and other components. For example, the 5G network slice 118 may include an AMF (access and mobility management function) 104, an NSSF (network slice selection function) 106, a NWDAF (network data analytics function) 108, an SMF (session management function) 110, a PCF (policy control function) 112, an SCP (service controller proxy or service communications proxy) 114, and one or more other AFs (application functions) 116.

The AMF 104 may be a part of 5G network architecture in control of registration management, connection management, reachability management, mobility management and various functions relating to security and access management and authorization. Under 3GPP specification, the AMF 104 may receive a registration request from a UE 102 and establish a PDU session. The AMF 104 may then send a slice selection request to the NSSF 106, which may include the requested NSSAI, the UE's 102 current tracking area (TA), and potentially other details. Based on the response from the NSSF 106, the AMF 104 may send a registration acceptance or rejection response to the UE 102. However, the AMF 104 may not be a policy-based network component, and may be unable to apply complex policy rules regarding slice selection for session establishment.

The NSSF 106 may be a control plane function within a 5G network. It may use the information provided by the AMF 104 to select the network slicing instance (NSI) by its NSSAI for a PDU session, determine the allowed network slice selection assistance information (NSSAI), and may identify and set an AMF 104 to serve the UE 102 for a PDU session. See, e.g., 3GPP TS 23.501 for details.

The NWDAF 108 may be a producer NF for a variety of analytics data for a 5G network. The NWDAF 108 may collect information from various components for the 5G network (e.g., AMFs 104 and UPFs, user plane functions) to generate the analytics data. One type of analytics data the NWDAF 108 can provide to consumer NFs, such as PCF 112, may include slice load information for 5G network slices 118. Consumers may subscribe to the NWDAF 108 for updates on specified analytics data at selected thresholds, such as to receive a notification when a load level for a selected slice is above a selected threshold. See, e.g., TS 29.520. Consumer NFs can also query information such as the load level of a slice as needed, rather than or in addition to subscribing for that slice.

The SMF 110 provides various functions relating to subscriber sessions, such as session establishment, modification, and release. A UE 102 may connect to a 5G network by initiating a communications session via the SMF 110. For example, a UE 102 may send a "PDU Session Establishment Request" to AMF 104, which may forward the message to the SMF 110. The SMF 110 may then set up a PDU or SM session with PCF 112 using an N7 interface protocol. The N7 interface may be a communication protocol used in 5G over HTTP. Accordingly, a 5G session may be referred to as an N7 session. The session establishment communication from SMF 110 may indicate a selected or desired slice on which to establish a PDU session.

The AF 114 may be configured to manage and provide application services to subscribers and UEs 102. AF 114 may manage properties of PDU or SM communication sessions for various resources. The AF 114 may manage these properties via Rx and N5 messages used to establish Rx/N5 sessions associated with an N7 PDU or SM session on a slice 118. N5 messages may be sent via the N5 interface protocol which, like N7 messages, are HTTP messages used within the 5G network. Rx messages may be part of the Diameter messaging protocol. For either type, the AF 204 may determine the PCF 112 associated with the communication session, and then route the N5 or Rx request to the corresponding PCF 112 via the appropriate interface protocol.

PCF 112 may be assigned to a subscriber session (e.g., a PDU session) created when a UE 102 registers with the 5G network. The PCF 112 may generate policy rules for the session to control quality of service and charging for the session, for example based on messaging from the SMF 110. The PCF 112 may be a policy-based component of the 5G network, and therefore may be configured to implement more complex policy-based rules and decisions than non policy-based components, such as the AMF 104.

As noted above, under 3GPP specifications, AMF 104 and NSSF 106 may manage slice 118 selection during PDU establishment. However, AMF 104 may not be able to apply a complex policy, e.g., based on DNN, S-NSSAI, subscCats (subscriber categories), or an operator-defined policy base, as can be enforced by a PCF 112. Therefore, PCF 112 can be a superior component to manage SM session rejection based on slice load or other policy elements. Further, while 3GPP defines N5 handling for overloaded slices, there is no corresponding guidelines for Rx messages. PCF 112 may once again enforce policy-based rejections of Rx messages during slice overload situations, in addition to managing N5 messages outside of the 3GPP defined policy. Additionally, when terminating or rejecting Rx or N5 sessions, the PCF 112 may be configured to terminate the corresponding SM session (which may have been established when a slice 118 was not in an overload state).

Accordingly, the PCF 112 may include a slice load module (SLM) 116 configured to manage SM session and Rx/N5 session establishment based on a load level for 5G network slice 118, as well as based on other policy-based factors. The SLM 116 may be configured to subscribe to NWDAF 108 for analytics data updates (e.g., load information) on one or more selected slices 118, query the NWDAF 108 for on-demand load information for a selected slice, or a combination thereof. Based on the received analytics data and load information, as well as operator-defined policy rules, the SLM 116 may elect to accept or reject session requests for a 5G network slice 118, for either PDU or SM sessions, or Rx or N5 sessions. When PCF 112 accepts or rejects the request, a corresponding response may be sent to SMF 110 for the PDU Session. In the event that the SLM 116 elects to reject an Rx or N5 session, the SLM may also be configured to terminate the corresponding PDU or SM session.

The proposed SLM 116 may enable PCF 112 to assist in slice decongestion cases by managing PDU session-related flows for N7, N5, and Rx sessions or messaging, based on NWDAF 108 reporting of slice data. Conversely, an AMF 104-based slice selection may only apply for N7 sessions. The SLM 116 can capture slice data through subscription as well as on-demand data flow between PCF 112 and NWDAF 108. The PCF 112 may become the controlling node for slice de-congestion cases for create and update scenarios. There may be many more AMF 104 nodes in a network than PCF 112 nodes, and therefore implementing slice decongestion via PCF can reduce the traffic load on NWDAF 108 from slice load subscribed updates. Even for on-demand cases, PCF 112 can cache NWDAF 108 responses to apply for multiple PDU session creation requests, and thus minimized traffic to the NWDAF.

The SLM 116 may assist in decongestion via delaying session creation for Rx and N5 sessions, or rejection of session creation for N7, Rx, and N5 sessions. Using the policy-based nature of PCF 112, fine-tuned policies at the PCF may allow for careful session management. A PCF 112 may perform Rx rejection based on slice load and other parameters received at a corresponding N7 PDU session, as an example. Since the proposed implementation does not alter or deviate from the behavior of 3GPP defined flows, an SLM 116 may be implemented at selected or all PCF 112 instances in an operator's network. The proposed solution may be applied to models "A," "B," "C," and "D" as suggested by 3GPP. The application of session management techniques based on slice load is discussed in regard to FIG. 2.

Figure 2:
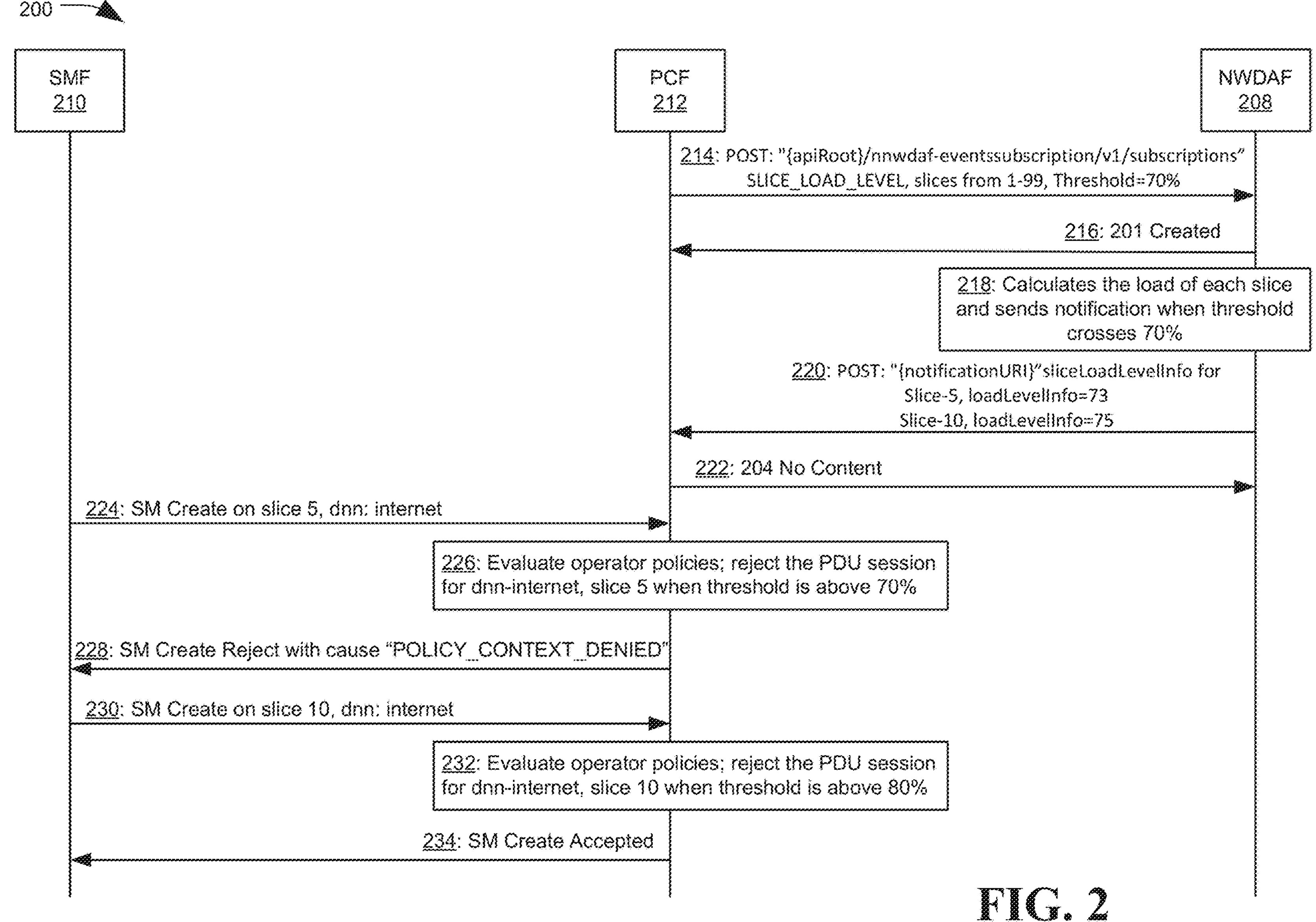
FIG. 2 depicts a flow diagram of an example method to perform network session processing based on slice load, in accordance with certain embodiments of the present disclosure.

FIG. 2 depicts a flow diagram 200 of an example method to perform network session processing based on slice load, in accordance with certain embodiments of the present disclosure. In particular, the example diagram 200 may depict the application of an SM policy within a network to consider slice load levels as part of a request to establish a PDU session. Diagram 200 depicts an example message flow between an SMF (session management function) 210, PCF (policy control function) 212, and NWDAF (network data analytics function) 208. In the example of diagram 200, the PCF 212 may be subscribed to NWDAF 208 for notifications regarding excess load levels for a slice range including a requested slice for the PDU session. The components in diagram 200 may correspond to elements described in regard to FIG. 1.

At 214, PCF 212 may send a subscribe request to NWDAF 208 for network analytics information; e.g., to receive load level information or notifications. The notification request may utilize the "Nwdaf_EventsSubscription" service operation including the Event ID "SLICE_LOAD_LEVEL", and may provide a list of slices and load threshold values at which to receive notifications. For example, the request may be in the form of: POST: "{apiRoot}/nnwdaf-eventssubscription/v1/subscriptions" with SLICE_LOAD_LEVEL, slices from 1-99, Threshold=70%. This subscription may instruct the NWDAF 208 to send the PCF 212 notifications for any slice from 1 to 99 when it reaches a load threshold of 70% or higher. The PCF 212 may subscribe to notifications for selected slices proactively, rather than in response to a PDU session establishment request. At 216, the NWDAF 208 may send a response indicating that the subscription was created. In some examples, responses may be in the form of hypertext transfer protocol (HTTP) or session initiation protocol (SIP) response codes, such as 201 for "Created".

At 218, the NWDAF 208 may calculate the load of each slice, and send notifications to subscribed NFs (network functions) such as PCF 212 according to the selected thresholds. In the case of the PCF 212 subscription from 214, the NWDAF 208 may determine if any slice from 1 to 99 has reached or exceeded a 70% load threshold. In the example of diagram 200, the NWDAF 208 may determine that slice 5 has a load level of 73%, and slice 10 has a load level of 75%, thus triggering a load notification according to the 70% threshold set by PCF 212. At 220, the NWDAF 208 may send the notification to PCF 212, for example in the form of: POST: "{notificationURI}" sliceLoadLevelInfo for Slice-5, loadLevelInfo=73; Slice-10, loadLevelInfo=75. The PCF 212 may acknowledge receipt of the notification, for example using a HTTP/HTTPS code response of "204 No Content", at 222. The PCF 212 may store the latest load levels for each subscribed slice, a flag indicating whether each slice is above the selected load threshold, or otherwise maintain a record of which slices are overloaded.

At 224, an SMF 210 may send the PCF 212 an SM or PDU session establishment request for slice 5, with a DNN (data network name) indicator of "internet". The session establishment request may be sent based on a UE connecting the network. The request may provide the requested slice via a S-NSSAI (single-network slice selection assistance information) identifier, for example, and may provide additional details for the session or UE.

In response to the session creation request, at 226 the PCF 212 may evaluate operator-established policies for allowing creation of a session on the requested slice, based on the details from the session creation request 224 and network analytics information from NWDAF 208 stored at the PCF 212. The operator policies may include factors such as various selected thresholds for selected slices, subscriber categories, session DNN information, percentage of PDU sessions that can be rejected, IP ranges, traffic impact, or other considerations. For example, policy rules may establish that emergency PDU sessions not be rejected even if a slice is overloaded. Based on these policies, the PCF 212 can reject a new incoming PDU session, or accept the request. In the presented example of diagram 200, the policy at the PCF 212 may be to reject a PDU session for dnn-internet at slice 5 when the load threshold is above 70%. Because the latest load information received at PCF 212 from NWDAF 208 for slice 5 indicates that the load level is 73%, then the threshold load has been exceeded and the PDU session creation request should be denied. The PCF 212 may issue the SM session creation rejection to SMF 210, at 228, with a configured "cause" defined in the response. For example, the response may include a cause of "POLICY_CONTEXT_DENIED" due to a rejection from the operator policy rules. Different cause messages may be provided based on which specific policy rules a session was rejected based on (e.g., "INSUFFICIENT_RESOURCES_SLICE").

Figure 3:
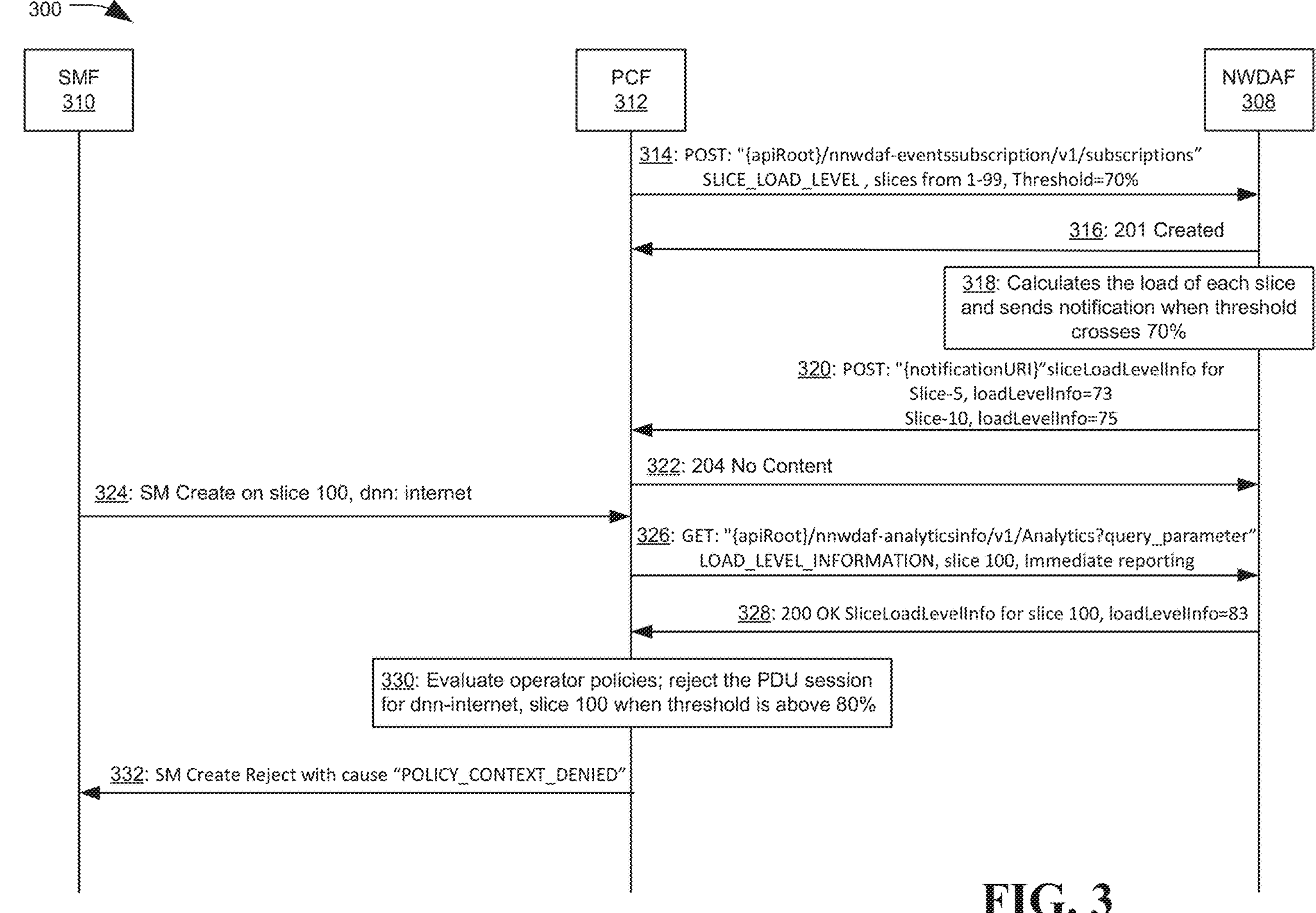
FIG. 3 depicts a flow diagram of an example method to perform network session processing based on slice load, in accordance with certain embodiments of the present disclosure.

The SMF 210 may next issue an SM session create request to PCF 212 for slice 10, dnn: internet, at 230. This may be an attempt to create a session on an alternate slice for the same UE, or it may be a new session creation request unrelated to the previous attempt. At 232, the PCF 212 may again evaluate the operator policies for the specified slice and DNN. In the example of diagram 200, the operator policies may indicate that PDU sessions for slice 10, dnn-internet should be rejected when the load is above 80%. Because the latest load information received at PCF 212 from NWDAF 208 for slice 10 indicates that the load level is 75%, then the threshold load has not been exceeded and the PDU session creation request should be accepted. At 234, the PCF 212 may send a response that the SM create request is accepted. FIG. 3 depicts an embodiment in which a PDU session is requested for a slice for which the PCF 212 is not subscribed for notifications.

FIG. 3 depicts a flow diagram 300 of an example method to perform network session processing based on slice load, in accordance with certain embodiments of the present disclosure. In particular, the example diagram 300 may depict the application of making on-demand requests for network analytics slice load information in order to apply an SM policy for establishing a PDU session. Diagram 300 depicts an example message flow between an SMF (session management function) 310, PCF (policy control function) 312, and NWDAF (network data analytics function) 308. The components in diagram 300 may correspond to elements described in regard to FIGS. 1 and 2.

A PCF 312 may not subscribe to load information for all slices, for example if certain slices are used infrequently or are backup slices. Not subscribing to all slices may reduce network traffic between NWDAF 308 and PCFs 312. For example, an NWDAF 308 may need to send notifications to each PCF 312 subscribed for a slice any time the slice rises above or falls below a selected threshold. The NWDAF 308 may also need to keep track of each threshold for each slice for each subscribed PCF 312, increasing computation overhead. Similarly, limiting the number of slices a PCF 312 subscribes to can reduce the amount of analytics data or information a PCF must store locally for all potential slices. Therefore, it may be advantageous to subscribe to commonly-used or selected slices, and to issue on-demand load requests for non-subscribed slices.

The elements of steps 314-322 may correspond to those described in regard to FIG. 2 for steps 214-222. In particular, PCF 312 may subscribe to NWDAF 308 for load notifications on slices 1-99 for loads at or above a 70% load threshold. In response, the NWDAF 308 may notify the PCF 312 that slice 5 has a load of 73 and slice 10 has a load of 75.

At 324, an SMF 310 may send an SM create request to PCF 312, for slice 100 and dnn: internet. At 326, the PCF 312 may determine that it does not have load information for slice 100, or that it is not subscribed for load notifications for slice 100, and accordingly may determine that it must make an on-demand request for load information from NWDAF 308. Accordingly, PCF 312 may issue an on-demand load request to NWDAF 308 for slice 100, for example in the form: GET: "{apiRoot}/nnwdaf-analyticsinfo/v1/Analytics?query_parameter", LOAD_LEVEL_INFORMATION, slice 100, Immediate reporting. In response, the NWDAF 308 may issue a response providing the load level information for slice 100, for example in the form, "200 OK SliceLoadLevelInfo for slice 100, loadLevelInfo=83", indicating that slice 100 currently has a load level of 83%.

Based on the SM create request 324, and the load level information provided at 328, the PCF 312 may evaluate operator policies for PDU session establishment on slice 100, dnn-internet, at 330. The policies may indicate that PDU sessions should be rejected for slice 100 when the load level is above 80%. In some example, the policies on load thresholds may be set for individual slices, slice ranges, or all slices. For example, a generic load threshold may be set that would apply for slice 100, even if there are not specific policy rules for slice 100. In the depicted example, since the load level is 83% and the policy rules dictate rejecting sessions when the load is above 80%, the PCF 312 may issue an SM create request rejection, with cause "POLICY_CONTEXT_DENIED" to SMF 310, at 332.

The processes described in FIGS. 2 and 3 may be for SM session establishment, but similar processes may be followed for session update requests from SMF 310. For example, if the slice was not overloaded during session establishment, but is now overloaded during session update, and if there is a policy rule for matching DNN or IP range, then the session may be terminated with a specified cause. When using a REACTIVATION_REQUESTED cause, an SMF/AMF may request the UE to re-initiate a PDU session, so that it can be setup through an alternate slice that is not overloaded.

Once an NWDAF 308 updates the load of a slice back to "normal" or below a selected threshold, a PCF 312 may once again accept PDU sessions for the slice. In some examples, a session rejection from PCF 312 may provide a backoff timer or retry interval, after which an SMF 310/AMF/UE may retry the PDU session at the selected slice, at which point the slice may have returned to a "normal" load status. Similar to N7 SM session establishment, FIGS. 4-5 describe example processes for Rx or N5 session evaluation based on network analytics such as slice load.

Figure 4:
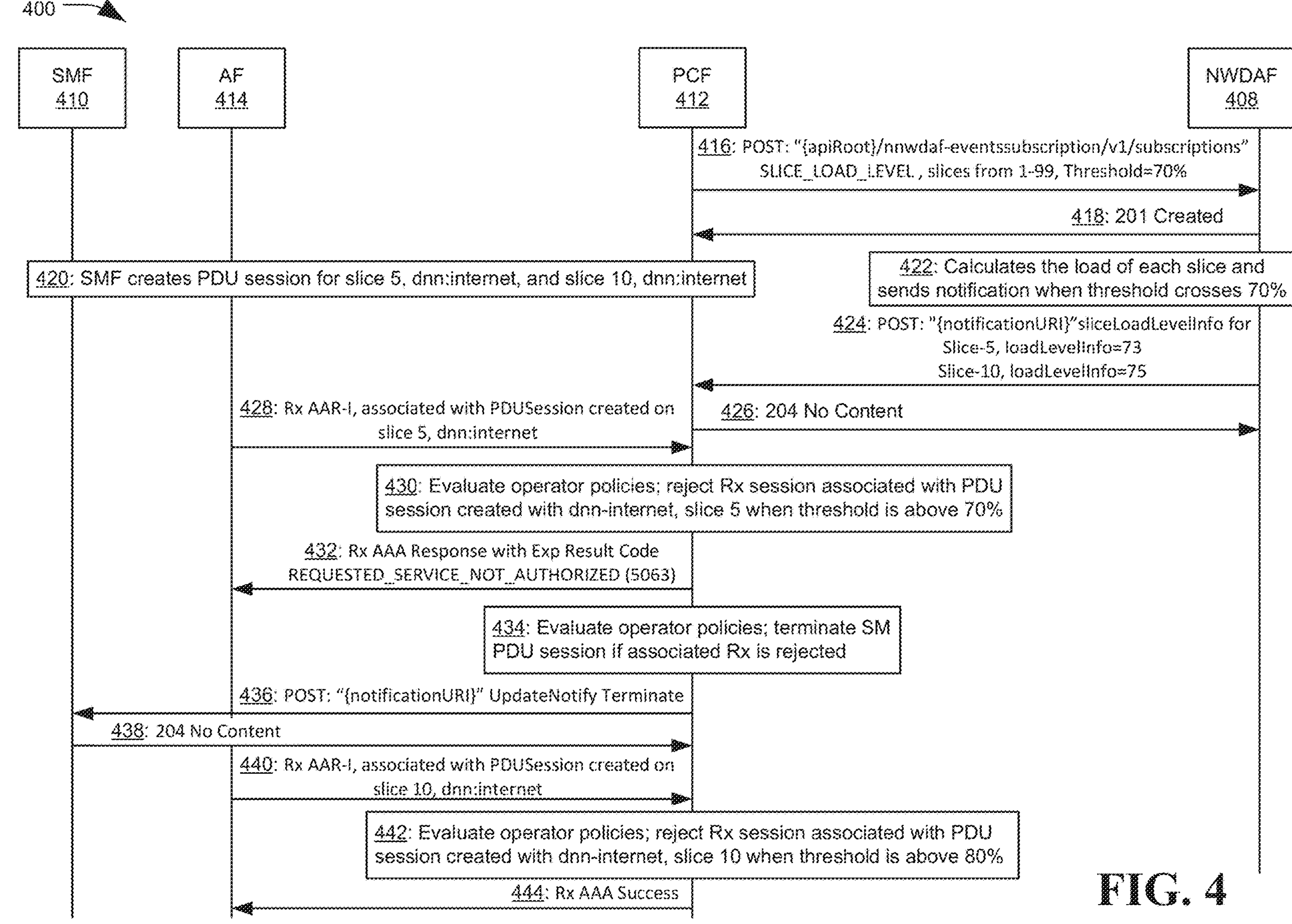
FIG. 4 depicts a flow diagram of an example method to perform network session processing based on slice load, in accordance with certain embodiments of the present disclosure.

FIG. 4 depicts a flow diagram 400 of an example method to perform network session processing based on slice load, in accordance with certain embodiments of the present disclosure. In particular, the example diagram 400 may depict the process to evaluate an Rx session request associated with a PDU session based on a slice load level of the network slice on which the PDU session is established. Although this example is focused on an Rx session request, the principles may be applied to other session requests, such as N5 requests. Diagram 400 depicts an example message flow between an SMF (session management function) 410, AF (application function) 414, PCF (policy control function) 412, and NWDAF (network data analytics function) 408. In the example of diagram 400, the PCF 412 may be subscribed to NWDAF 408 for notifications regarding excess load levels for a slice range including a slice on which the PDU session is established. The components in diagram 400 may correspond to elements described in regard to FIGS. 1-3.

At 416, PCF 412 may subscribe to NWDAF 408 for network analytics information for slices 1-99, and in particular to slice load level information at a threshold of 70% load. The NWDAF 408 may provide a response at 418 that the notification subscription has been established.

At 420, SMF 410 may have created a PDU session on slice 5 with dnn: internet, and a PDU session on slice 10 with dnn: internet. In an example embodiment, these PDU sessions may have been established when slices 5 and 10 were not overloaded, or when the PDU session establishment requests otherwise passed the policy rules for acceptance at PCF 412.

At 422, the NWDAF 408 may calculate load levels for each slice, and may send a notification to PCF 412 when the load level for any subscribed slice crosses 70%. At 424, the NWDAF 408 may provide a notification that slice 5 has a load level of 73%, and slice 10 has a load level of 75%. PCF 412 may store or record the load level information, and send an acknowledgement response to NWDAF 408 at 426.

At 428, an AF 414 may send PCF 412 a request to establish an Rx session associated with the established PDU session on slice 5, dnn: internet. For example, the AF 414 may send an initial authorization authentication request (AAR-I) message via Diameter message protocol for an Rx session. An AF 414 may request Rx sessions to manage data resources for an SM PDU session.

At 430, the PCF 412 may evaluate operator policy rules regarding Rx session establishment based on the network analytics for the slice and details of the PDU session. In the depicted example, the policy rules may direct the PCF 412 to reject Rx sessions associated with a PDU session created with dnn-internet on slice 5 when the load threshold is above 70%. Because the load on slice 5 was last reported at 73%, the PCF 412 may issue a response to AF 414 rejecting the Rx request, at 432. For example, the PCF 414 may issue an Rx authorization authentication answer (AAA) response, with the explanation result code of "REQUESTED_SERVICE_NOT_AUTHORIZED (5063)".

In some examples, a PCF 412 may be configured, for example based on operator policies, to evaluate whether to terminate a PDU session based on whether an associated Rx session was rejected. At 434, the PCF 412 may evaluate the operator policies based on rejecting the Rx request at 432, and may determine that the policies direct the PCF to terminate an SM PDU session if an associated Rx session is rejected. Accordingly, PCF 412 may issue a session termination message to SMF 410, at 436. For example, the termination message may be in the form of POST: "{notificationURI}" UpdateNotify Terminate. The SMF 410 may terminate the indicated PDU session, and send an acknowledge message to PCF 412, at 438.

Figure 5:
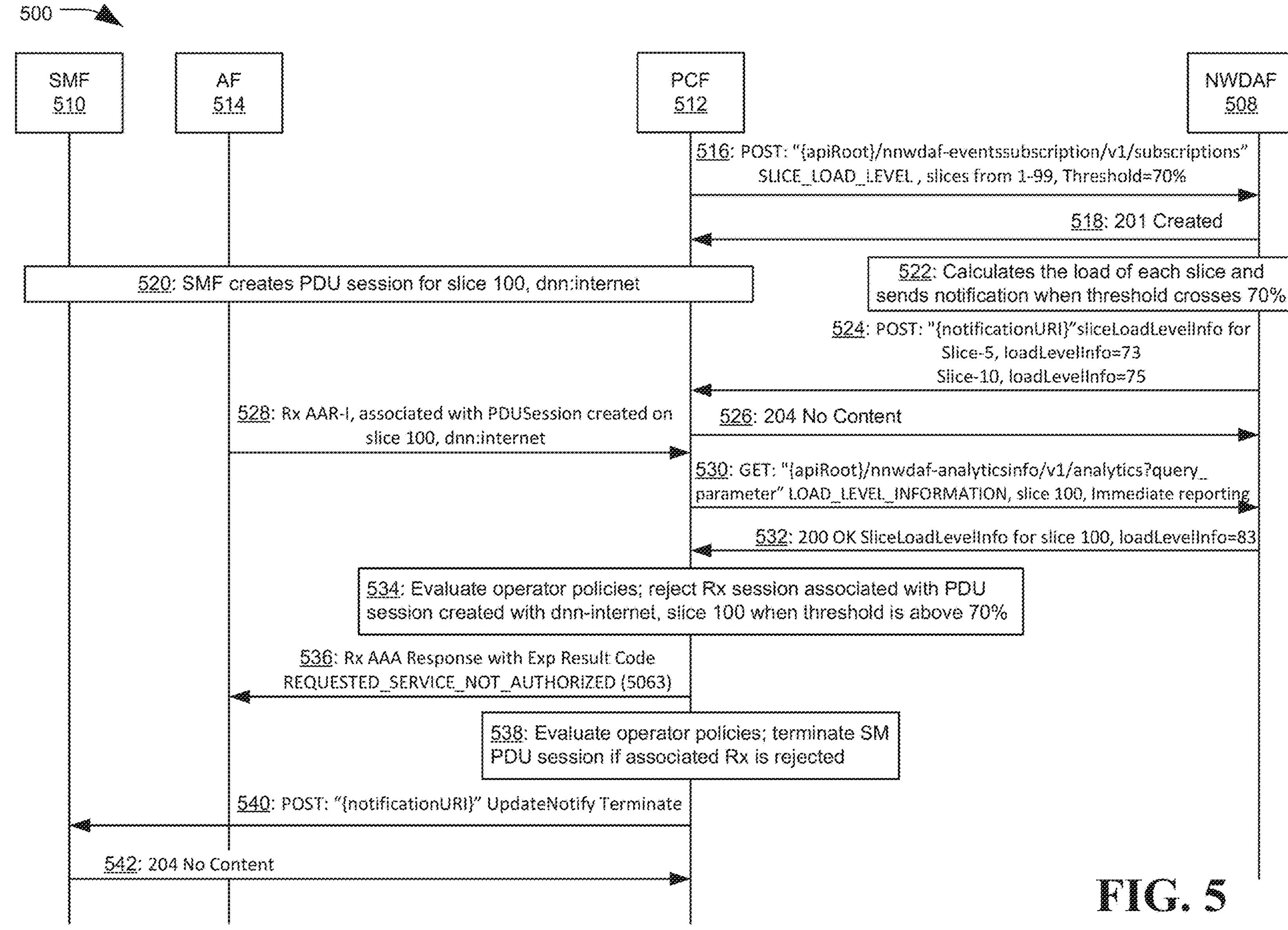
FIG. 5 depicts a flow diagram of an example method to perform network session processing based on slice load, in accordance with certain embodiments of the present disclosure.

At 440, the AF 414 may issue another Rx session request, for the PDU session created on slice 10, with dnn:internet. The PCF 412 may evaluate the operator policies, and determine that it should reject Rx sessions associated with PDU sessions created with dnn-internet on slice 10 when the load threshold is above 80%. Since the latest load information for slice 10 indicates a load level of 75%, the PCF 412 may allow the Rx session to be created, and issue a notification to AF 414 that the Rx session was successful. FIG. 5 depicts a flow diagram for requesting creation of an Rx or N5 session for a PDU session on a slice to which a PCF is not subscribed.

FIG. 5 depicts a flow diagram 500 of an example method to perform network session processing based on slice load, in accordance with certain embodiments of the present disclosure. In particular, the example diagram 500 may depict the application of making on-demand requests for network analytics slice load information in order to apply an SM policy for establishing an Rx session associated with a PDU session. Although this example is focused on an Rx session request, the principles may be applied to other session requests, such as N5 requests. Diagram 500 depicts an example message flow between an SMF (session management function) 510, AF (application function) 514, PCF (policy control function) 512, and NWDAF (network data analytics function) 508. The components in diagram 500 may correspond to elements described in regard to FIGS. 1-4.

The elements of steps 516-518 and 522-526 may correspond to those described in regard to FIG. 4 for steps 416-418 and 422-426. In particular, PCF 512 may subscribe to NWDAF 508 for load notifications on slices 1-99 for loads at or above a 70% load threshold. The NWDAF 508 may notify the PCF 512 that slice 5 has a load of 73 and slice 10 has a load of 75.

In the example of diagram 500, the SMF 510 may establish a PDU session on slice 100 for dnn: internet, at 520. At 528, the AF 514 may issue a request to establish an Rx or N5 session associated with the PDU session created on slice 100 with dnn: internet. In response, the PCF 512 may determine that it does not have load level information for slice 100, or that it is not subscribed for slice 100 load level information. The PCF 512 may therefore send an on-demand load level request to NWDAF 508 for load information on slice 100, at 530. At 532, the NWDAF 508 may respond with the current load level for slice 100, which in the depicted example may be 83%.

At 534, the PCF 512 may evaluate the operator policies regarding Rx session establishment for slice 100 based on load level. The policies may indicate that Rx sessions should be rejected that are associated with a PDU session created with dnn-internet on slice 100 when the load threshold is above 70%. Because the slice 100 load is above the threshold specified in the policy rules, the PCF 512 may send an Rx session rejection to AF 514, for example as an Rx AAA response with a result code or cause of "REQUESTED-_SERVICE_NOT_AUTHORIZED (5063)"

The PCF 512 may also evaluate the policy rules for terminating an SM PDU session if an associated Rx session is rejected, at 538. The policies may direct the PCF 512 to terminate the PDU session, and accordingly the PCF may issue a termination message to SMF 510, at 540. The SMF 510 may terminate the PDU session, and send an acknowledgement message to PCF 512, at 542. FIGS. 6 and 7 depict example policy rule tables employed by a PCF to manage network session requests.

FIG. 6 depicts a set of tables 600 of a system configured to implement network session processing based on slice load, in accordance with certain embodiments of the present disclosure. In particular, the table set 600 may include a set of policy rules for N7 to N5 sessions which may be implemented at a PCF to determine how to manage SM PDU session requests initiated via an N7 message protocol, and associated resource sessions initiated via an N5 message protocol. The tables 600 may include a Table 1 602 defining slice to action mapping, and an associated Table 2 604 providing details on how to implement a given action from Table 1. The tables 600 may be stored at or executed by a PCF in an operator's network, such as PCF 112 of FIG. 1. The policies and actions defined in tables 600 may be configured by a network operator implementing the PCF function.

Table 1 602 may include a plurality of columns that associate a ruleset ID for a slice and its effective load level to actions to be taken by the PCF. The columns may include "SliceInfo" 606, "Reported Load" 608, "Level" 610, "N7 Set Id" 612, and "N5 Set Id" 614. The columns of Table 1 602 are examples, and different columns, or columns having different identifiers, may be used.

The SliceInfo column 606 may provide one or more IDs (identifiers) for specific slices or their associated rulesets.

Each slice may have multiple entries in the SliceInfo column 606, which may correspond to different actions based on different values in the Reported Load column 608, or other columns. The Reported Load column 608 may list load value thresholds that may define which actions to apply. For example, at 50% load, a first action may be taken for a given slice, while different actions may be taken for that same slice at load levels of 70% or 90%. In some examples, a session initiation request may specify a slice ID, which a PCF may use to retrieve an associated load value (e.g., from NWDAF 108) for that slice. The slice ID and load information may be used to lookup appropriate actions to take in Table 1 602.

The Level column 610 may include different load levels or corresponding action tiers, which may correlate to different load thresholds specified in the Reported Load column 608. For example, for a slice 1, a Reported Load 608 of 50 may correspond to a Level L1, while a Reported Load of 70 may correspond to a Level L2, and a Reported Load of 90 may correspond to a Level L3. The action tiers of the Level column 610 may correspond to different actions depending on if the requested session is an N7 session or an N5 session. The N7 Set Id column 612 may correspond to a given action in Table 2 604 for various types of requested N7 sessions. Similarly, the N5 Set Id column 614 may correspond to a given action in Table 2 604 for various types of requested N5 sessions. There may be multiple different actions associated with each value in the N7 Set Id column 612 or the N5 Set Id column 614 based on the value in the Level column 610 or other factors.

Table 2 604 may include a plurality of columns linking various values from Table 1 602 to specific action responses to be taken by a PCF in response to an N7 or N5 session initiation or update request. The columns may include "SetId" 616, "Criteria" 618, "Level" 620, "Traffic Impact" 622, "Type" 624, and "Action" 626. As with Table 1 602, the columns of Table 2 604 are examples, and different columns, or columns having different identifiers, may be used.

The Set Id column 616 may list values corresponding to the values from the N7 Set Id column 612 and the N5 Set Id column 614 from Table 1 602. Based on the SliceInfo 606 and Reported Load 608 from Table 1 602, and the type of session requested (N7 or N5), the appropriate Set Id action from Table 1 may be looked up via the Set Id column 616 in Table 2 604. There may be multiple rows corresponding to a Set Id column 616 value, with different or additional actions specified based on various other values in the Table 2 columns, such as the "Criteria" column 618.

The Criteria column 618 may list various factors from the session requests that may be considered in reaching an appropriate action. For example, the Criteria column 618 may have different entries per Set Id 616 value based on the DNN type specified in a session request, or based on an IP Range included in the request. Based on the appropriate Set Id 616 value for a session request, the PCF may check the Criteria column 618 for any true conditions of the request, and execute appropriate actions.

The Level column 620 of Table 2 604 may directly correspond to the Level column 610 of Table 1 602. The appropriate policy rule to implement may depend on both the Set ID 616 and the action tier or load level Level value 620 for the request type and slice. A Set ID value 616 may correspond to multiple different actions based on Criteria 618, Level 620, or Type 624 column values.

The Traffic Impact 622 column may identify a ratio or percentage of session requests that should be rejected based on the session type, slice load, or other factors. For example, a 70% Traffic Impact value 622 may direct the PCF to reject 70% of session requests that fall within the appropriate action or rule of Table 2 604.

The Type column 624 may correspond to the type of session request being received. For example, session requests may be to "create" a new session, or to "update" an existing session. Different actions may be applied based on different Types 624 of requests. For example, at a 90% load at Level L3, 100% of "create" requests may be rejected, while only 10% of update requests may be rejected and their associated sessions terminated.

The Action column 626 may specify what action(s) the PCF should take in response to a session request, including a cause to provide in the action response, based on all of the considered factors in Table 1 602 and Table 2 604. As an example, when the tables 600 direct a PCF to reject an N7 creation request, the action may include "Reject" with a response code of "403: POLICY_CONTEXT_DENIED", while a rejection of an N7 update request may include "Terminate" with a cause provided of "REACTIVATION_REQUESTED", indicating to the requesting SMF or UE to reinitiate a new session, which may be directed to less congested slice. Meanwhile, when the tables 600 direct a PCF to reject an N5 creation request, the action may include "Reject" with response code of "403: REQUESTED_SERVICE_TERMORARILY_NOT_AUTHORIZED". In some examples, the Action column 626 may include additional operations to take beyond rejecting requests. For example, the response may specify a "retryinterval=x", notifying the requesting node of a recommended period after which to retry its session request, potentially allowing the congestion level of the requested slice to reduce. In another example, an Action 626 rejecting an N5 session request may also direct the PCF to terminate an associated N7 session. While the N5 rejection may be sent to an AF, the associated N7 termination may be sent to an SMF, with the action "Terminate N7" and cause "REACTIVATION_REQUESTED". Other actions may also be included.

In the depicted example of FIG. 6, an N7 session creation request may be received at a PCF for a slice corresponding to the SliceInfo 606 of {"sst":1,"sd":"A08923" }, which may correspond to the first three rows of Table 1 602. The PCF may determine the load level for this slice, either based on subscribed load information or making an on-demand request to an NWDAF. If the Reported Load 608 is below 50%, the session request may be allowed. If the Reported Load 608 is between 50 and 69%, the PCF may determine the Level 610 is L1, and that the N7 session corresponds to a N7 Set Id column 612 value of 1. In Table 2 604, the PCF may look up Set ID 616 value of 1 based on the N7 Set Id column 612 value. The PCF may check the Criteria column 618 for all rows having Set Id value of 1, and may therefore compare if the N7 session request has a Dnn="internet" value. If not, the session may be allowed. If the Criteria 618 condition is met, the PCF may determine if the session request was a "Create" request, based on the Type column 624. If it is, the PCF may determine that the operations specified in Action column 626 should be applied to 70% of such requests, according to the Traffic Impact column 622. Therefore, the PCF may have a 70% chance of applying a "Reject—403: POLICY_CONTEXT_DENIED" action to N7 session create request. However, if the Reported Load for the slice was 90-100%, it may indicate a Level 610 L3 situation. For a Set Id of 1 with an L3 level 620, the PCF may determine if the session was an "Update" or a "Create" Type 624. 10% of update requests may result in termination, while 100% of creation requests may result in rejection.

Meanwhile, an N5 request for the SliceInfo 606 of {"sst": 1,"sd":"A08923" } may correspond to N5 Set Id 614 values of either 2 or 3, based on the reported load (as opposed to N7 requests, which may always have an N7 Set Id 612 value of 1 for this slice). For example, an N5 request for the specified slice may have an N5 Set Id 614 value of 2 for reported load 608 levels of 50 or 70, and an N5 Set Id 614 value of 3 for a reported load 608 level of 90. In Table 2 604, a Set Id 616 value of 6 may have two different Criteria 618 options. A PCF may first determine if the request has a Dnn="internet" first, and if so, apply the rules for that Criteria 618, for example based on whether the Level 620 for the slice was L2 or L3. If the Dnn Criteria 618 does not apply, the PCF may next determine whether the IP Range of the request falls within the specified Criteria range, regardless of the Level 620 value (e.g., an asterisk in a Table 600 may indicate a variable that can apply to any value). If the IP Range is appropriate, it may apply the corresponding action for that Criteria 618. An operator may define how a PCF applies policies when multiple potential actions or Criteria 618 categories can apply, such as applying a first appropriate action, applying all appropriate actions, or a selected order or subset of appropriate actions.

As can be seen in the Tables 600, both N7 sessions, and N5 sessions associated with them, may be included or managed by the same policy rules tables. Another example table set, for Rx sessions, is depicted in regard to FIG. 7.

FIG. 7 is a set of tables 700 of a system configured to implement network session processing based on slice load, in accordance with certain embodiments of the present disclosure. In particular, the tables 700 may provide a set of policy rules to implement at a PCF in response to a session request via an Rx message protocol for a resource session associated with an N7 SM or PDU session. The Tables 700 may include a Table 3 702, providing slice to action mapping, and a Table 4 704 providing definitions for a given action. The tables 700 may be stored at or executed by a PCF within an operator's network, such as PCF 112 of FIG. 1.

The columns described in regard to Table 1 602 and Table 2 604 in FIG. 6 apply to the columns of Table 3 702 and Table 4 704, respectively. A distinction is that Table 1 602 of FIG. 2 depicts columns for both N7 Set Id 612 and N5 Set Id 614, while Table 3 702 includes only a column for Rx Set Id 706. An operator may choose to implement a separate set of tables for each session type (N7, N5, Rx), or combine some or all session types into one or more tables. For example, N7 and N5 messaging both use HTTP message protocols, while Rx messaging uses Diameter message protocols. As the responses to a request may be generated or sent in the same message protocol as the received request, a PCF may need to use different response protocols for the N7/N5 and Rx messages, and the tables may therefore be grouped by similar protocols. Additional information provided in response to Rx session requests, such as a retry interval, may provided via a Diameter message protocol, for example by using custom Diameter AVP (attribute value pair) information. In other embodiments, an operator may include all session types (e.g., N7, N5, and Rx) into a single table or set of tables. A computing system configured to perform the operations and methods described herein is provided in regard to FIG. 8.

FIG. 8 is a diagram of a system 800 configured to implement network session processing based on slice load, in accordance with certain embodiments of the present disclosure. System 800 may be an example of an apparatus including a computing system 801 that is representative of any system or collection of systems in which the various processes, systems, programs, services, and scenarios disclosed herein may be implemented. For example, computing system 801 may be an example user equipment 102, network connectivity components 120, 5G network slice 118, PCF 112, SLM 116, or any of the other components or subcomponents depicted in system 100 of FIG. 1. Examples of computing system 801 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 801 may be implemented as a single apparatus, system, or device or may be implemented in a distributed manner as multiple apparatuses, systems, or devices. Computing system 801 may include, but is not limited to, processing system 802, storage system 803, software 805, communication interface system 807, and user interface system 809. Processing system 802 may be operatively coupled with storage system 803, communication interface system 807, and user interface system 809.

Processing system 802 may load and execute software 805 from storage system 803. Software 805 may include and slice load management process 806, which may be representative of any of the operations implementing session management based on slice load or other network analytics, as discussed with respect to the preceding figures. When executed by processing system 802, software 805 may direct processing system 802 to operate as described herein for at least the various processes, operational scenarios, and sequences discussed in the foregoing implementations. Computing system 801 may optionally include additional devices, features, or functionality not discussed for purposes of brevity.

In some embodiments, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 may include general purpose central processing units, graphical processing units, application specific processors, and logic devices, as well as any other type of processing device, combinations, or variations thereof.

Storage system 803 may comprise any memory device or computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including slice load management process 806 among other functions) may be implemented in program instructions that may, when executed by processing system 802, direct processing system 802 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system as described herein. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A policy control function (PCF) system, comprising:
one or more processors; and
a memory having stored thereon instructions that, upon execution by the one or more processors, cause the one or more processors to:
receive a network session request corresponding to a specified network slice, a network slice including a particular portion of a network's capacity;
determine a load level of the specified network slice;
compare the load level of the specified network slice against a set of policy rules including a selected threshold and a second threshold;
reject a selected percentage of network session requests for the specified network slice when the load level is above the second threshold but below the selected threshold; and
reject the network session request when the load level is above the selected threshold.

2. The PCF system of claim 1, wherein the instructions comprise further instructions that, upon execution by the one or more processors, cause the one or more processors to:
subscribe to receive a slice load level notification from a network data analysis function (NWDAF); and
determine the load level based on information in the slice load level notification.

3. The PCF system of claim 2, wherein the instructions comprise further instructions that, upon execution by the one or more processors, cause the one or more processors to:
receive the slice load level notification from the NWDAF for the specified network slice identifying a current load level value;
store the current load level value; and
determine the load level based on retrieving the current load level value.

4. The PCF system of claim 3, wherein the instructions comprise further instructions that, upon execution by the one or more processors, cause the one or more processors to:
subscribe to receive the slice load level notification by issuing a subscription message identifying:
a selected network slice to receive a notification on; and
a selected load level threshold at which to receive the notification.

5. The PCF system of claim 4, wherein the instructions comprise further instructions that, upon execution by the one or more processors, cause the one or more processors to:
determine whether the specified network slice from the network session request corresponds to a subscribed network slice for which the PCF receives the slice load level notification; and
when the specified network slice does not correspond to the subscribed network slice, send an on-demand request to the NWDAF for the load level of the specified network slice.

6. The PCF system of claim 5, wherein the instructions comprise further instructions that, upon execution by the one or more processors, cause the one or more processors to:
reject all network session requests for the specified network slice when the load level is above the selected threshold.

7. The PCF system of claim 6, further comprising:
the network session request includes a request to create a packet data unit (PDU) session on a 5G network, received from a session management function (SMF).

8. The PCF system of claim 6, further comprising:
the network session request includes a session to manage resources associated with a packet data unit (PDU) session on a 5G network, the session to manage resources initiated via an Rx protocol message from an application function (AF).

9. The PCF system of claim 8, wherein the instructions comprise further instructions that, upon execution by the one or more processors, cause the one or more processors to:
based on the load level being above the selected threshold, evaluate a policy rule table to determine whether to terminate the PDU session associated with the session to manage resources; and
terminate the PDU session based on the policy rule table.

10. The PCF system of claim 1, wherein the instructions comprise further instructions that, upon execution by the one or more processors, cause the one or more processors to:
determine the load level, including:
send an on-demand request to a network data analysis function (NWDAF) to receive a response including the load level of the specified network slice.

11. A method comprising:
operating a policy control function (PCF) of a mobile network, including:
receiving a network session request corresponding to a specified network slice, a network slice including a particular portion of a network's capacity;

determining a load level of the specified network slice;

comparing the load level of the specified network slice against a set of policy rules including a selected threshold and a second threshold; and rejecting a selected percentage of network session requests for the specified network slice when the load level is above the second threshold but below the selected threshold; and rejecting the network session request when the load level is above the selected threshold.

12. The method of claim 11 further comprising:

subscribing to receive a slice load level notification from a network data analysis function (NWDAF); and determining the load level based on information in the slice load level notification.

13. The method of claim 12 further comprising:

receiving the slice load level notification from the NWDAF for the specified network slice identifying a current load level value;

storing the current load level value; and determining the load level based on retrieving the current load level value.

14. The method of claim 12 further comprising:

subscribing to receive the slice load level notification by issuing a subscription message identifying:

a selected network slice to receive a notification on; and a selected load level threshold at which to receive the notification.

15. The method of claim 12 further comprising:

determining whether the specified network slice from the network session request corresponds to a subscribed network slice for which the PCF receives the slice load level notification; and sending an on-demand request to the NWDAF for the load level of the specified network slice when the specified network slice does not correspond to the subscribed network slice.

16. The method of claim 11 further comprising:

rejecting all network session requests for the specified network slice when the load level is above the selected threshold.

17. The method of claim 11 further comprising:

the network session request includes a request to create a packet data unit (PDU) session on a 5G network, received from a session management function (SMF).

18. The method of claim 11 further comprising:

the network session request includes a session to manage resources associated with a packet data unit (PDU) session on a 5G network, the session to manage resources initiated via an Rx protocol message from an application function (AF).

19. The method of claim 18 further comprising:

based on the load level being above the selected threshold, evaluating a policy rule table to determine whether to terminate the PDU session associated with the session to manage resources; and terminating the PDU session based on the policy rule table.

20. The method of claim 11 further comprising:

determining the load level includes sending an on-demand request to a network data analysis function (NWDAF) to receive a response including the load level of the specified network slice.

* * * * *